US00RE50486E

(19) United States
(12) Reissued Patent
Kushnirov et al.

(10) Patent Number: US RE50,486 E
(45) Date of Reissued Patent: Jul. 8, 2025

(54) MOUNTING PANEL WITH ELONGATED TONGUE

(71) Applicant: Cardo Systems, Inc., Raanana (IL)

(72) Inventors: Avraham Kushnirov, Or-Yehuda (IL); Yossef Twina, Rosh-Ha'ayin (IL)

(73) Assignee: Cardo Systems, Inc., Pittsburgh, PA (US)

(21) Appl. No.: 17/950,725

(22) Filed: Sep. 22, 2022

Related U.S. Patent Documents

Reissue of:
(64) Patent No.: 8,600,094
Issued: Dec. 3, 2013
Appl. No.: 13/241,498
Filed: Sep. 23, 2011

U.S. Applications:
(60) Provisional application No. 61/434,774, filed on Jan. 20, 2011.

(51) Int. Cl.

| | |
|---|---|
| ***H04R 25/00*** | (2006.01) |
| ***H04M 1/00*** | (2006.01) |
| ***H04M 1/05*** | (2006.01) |
| ***H04M 9/00*** | (2006.01) |
| ***H04R 1/02*** | (2006.01) |
| ***H04R 1/10*** | (2006.01) |

(52) U.S. Cl.
CPC ..... *H04M 1/05* (2013.01); *H04R 1/028* (2013.01); *H04R 1/105* (2013.01); *H04R 1/10* (2013.01); *H04R 2201/023* (2013.01); *H04R 2420/07* (2013.01)

(58) Field of Classification Search
CPC ..... H04M 1/05; H04R 1/10; H04R 1/105
See application file for complete search history.

(56) References Cited

U.S. PATENT DOCUMENTS

| | | | | |
|---|---|---|---|---|
| 5,438,702 | A * | 8/1995 | Jackson | A42B 3/30 455/100 |
| 5,790,681 | A | 8/1998 | Leppalahti | H04R 1/10 381/370 |
| 6,075,857 | A | 6/2000 | Doss et al. | |
| 6,789,771 | B1 | 9/2004 | Shick et al. | |
| 6,978,034 | B2 | 12/2005 | Lazzeroni et al. | |
| 8,688,040 | B2 | 4/2014 | Jung | |
| 2004/0109580 | A1 | 6/2004 | Lazzeroni et al. | |
| 2006/0277666 | A1 | 12/2006 | Gertsch et al. | |
| 2007/0280053 | A1 | 12/2007 | Polany et al. | |
| 2008/0166004 | A1 * | 7/2008 | Sanford | H01Q 1/243 343/904 |
| 2009/0264073 | A1 | 10/2009 | Kushnirov | |

OTHER PUBLICATIONS

Undated Users Guide for SMH10.
FCC Documents Dated Sep. 23, 2009.

* cited by examiner

*Primary Examiner* — Nick Corsaro
(74) *Attorney, Agent, or Firm* — Manuel de la Cerra

(57) ABSTRACT

A device for mounting a communication headset to a helmet includes a mounting panel having a seat in a front surface thereof that includes a set of electrical contacts and a guide, a printed circuit board 110 in electrical connection with the electrical contacts, and an elongated tongue affixed to the mounting panel. The tongue is configured for insertion between an inner shell and an outer shell of a protective helmet. Also, a wireless communication device can have such a tongue affixed to it. The tongue can be forked or otherwise arranged to have plural broad surfaces extending to a free end.

18 Claims, 7 Drawing Sheets

MOUNTING PANEL WITH ELONGATED TONGUE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

The present application claims priority and the benefit of U.S. patent application Ser. No. 61/434,774, filed Jan. 20, 2011, which is hereby incorporated by reference as if set forth in its entirety herein.

TECHNICAL FIELD OF THE INVENTION

The present invention relates to a mounting device for a communication headset, and more particularly, relates to a mounting device for a communication headset that is configured to engage with a protective helmet.

BACKGROUND OF THE INVENTION

It will be appreciated that many types of protective helmets are used across many different industries. For example, hard hats are universally worn by those working at a construction site, as well as by those who operate heavy industrial equipment, etc. Athletes who participate in various sports, such as baseball and football, also wear helmets for protection, and the helmet is one of the most critical pieces of equipment for a professional race car driver. Helmets are also used in many military settings. One of the most commonly used protective helmets in contemporary society is the motorcycle helmet. Most motorcycle riders wear helmets in the interests of safety, as well as due to state and local laws and regulations requiring them.

As is well known, Bluetooth® is an industrial specification for wireless personal area networks (PANs). Bluetooth provides a way to connect and exchange information between devices, such as mobile phones, laptops, personal computers, printers, GPS receivers, digital cameras and video game consoles over a secure, globally unlicensed short-range radio frequency. One of the most common applications of Bluetooth is for wireless control of and communication between a mobile phone and a hands-free headset that allows the transfer of sound data between the two devices.

While many Bluetooth headsets are presently available to consumers, these headsets (which generally mount on the user's ear) are generally of little utility to motorcycle riders who wear helmets while they ride. Various attempts have been made to enable the use of Bluetooth headsets in conjunction with motorcycle helmets, but these approaches have required either the use of a mounting clamp, or the use of an adhesive external adapter. Neither of these solutions are particularly easy to implement, sometimes requiring involved installation and/or maintenance procedures.

It is with respect to these considerations and others that the disclosure made herein is presented.

SUMMARY OF THE INVENTION

Technologies are presented herein for a device for mounting a communication headset to a helmet. According to one aspect, the device includes a mounting panel having a seat in a front surface thereof. The mounting panel also includes a set of electrical contacts and a guide. Additionally, a printed circuit board in electrical connection with the electrical contacts is provided, and an elongated tongue is affixed to the mounting panel. The tongue is preferably configured for insertion between an inner shell and an outer shell of a protective helmet.

According to another aspect, a helmet-mountable communication headset is provided. The headset includes a wireless communication device configured to support two-way communication with a second device. The wireless communication device further includes a microphone and a speaker. An elongated tongue is affixed to the wireless communication device and is configured for insertion between an inner shell and an outer shell of a protective helmet.

The tongue can be forked or otherwise arranged to have plural broad surfaces extending to a free end.

These and other aspects, features, and advantages can be appreciated from the accompanying description of certain embodiments of the invention.

DETAILED DESCRIPTION OF CERTAIN EMBODIMENTS OF THE INVENTION

The following detailed description is directed to a device for mounting a communication headset to a helmet. In the following detailed description, references are made to the accompanying drawings that form a part hereof, and which are shown by way of illustration through specific embodiments or examples.

Figure 1:
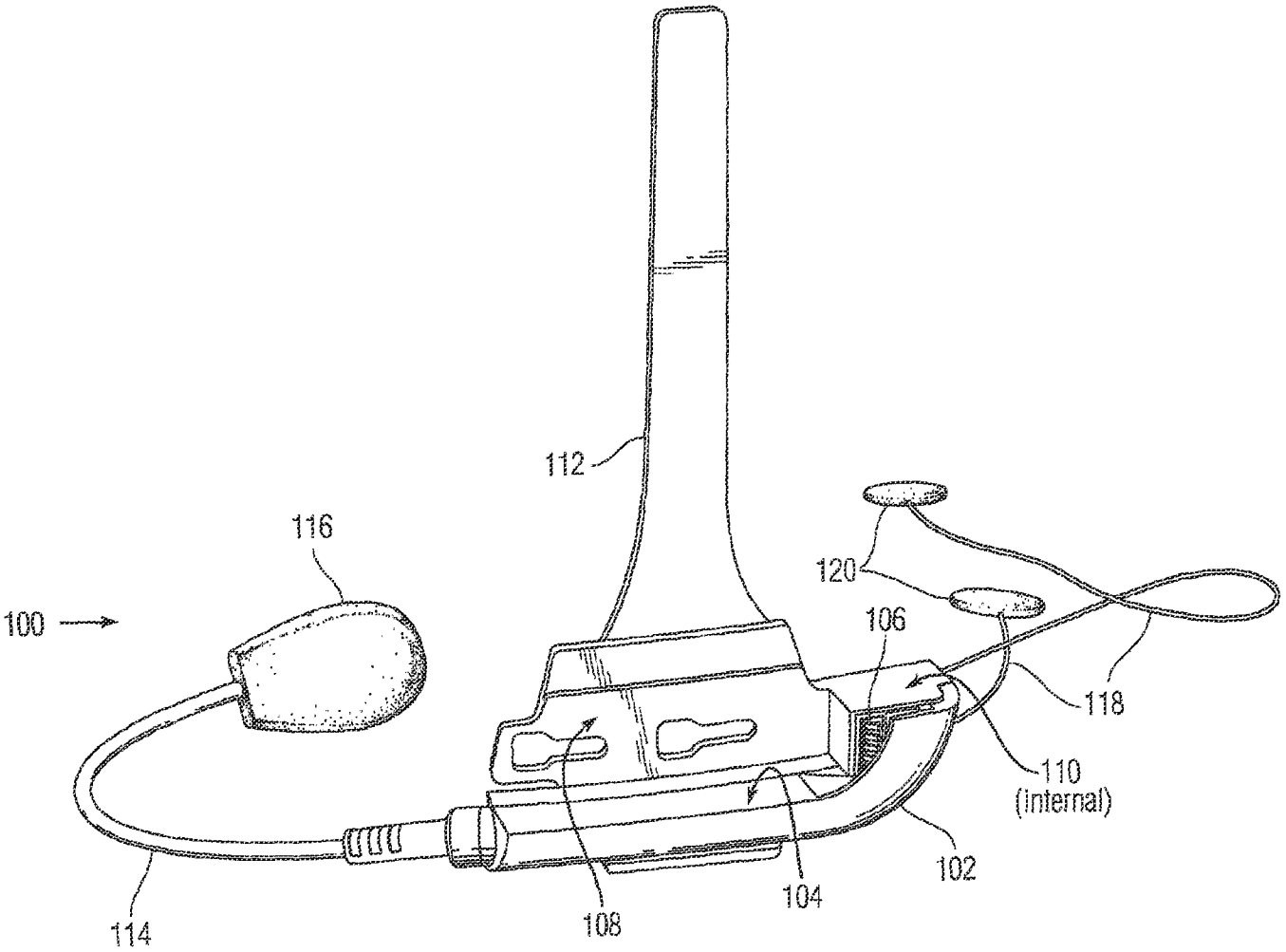
FIG. 1 is an exemplary diagram of the device for mounting a communication headset according to one embodiment disclosed herein.

Referring now to the drawings, it is to be understood that like numerals represent like elements through the several figures, and that not all components and/or steps described and illustrated with reference to the figures are required for all embodiments. FIG. 1 is an exemplary diagram of the device for mounting a communication headset 100 according to one embodiment disclosed herein. The device for mounting a communication headset 100 includes a mounting panel 102 having a seat 104 in a front surface thereof. The mounting panel 102 further includes a set of electrical contacts 106, which enable communications between the device 100 and a communication headset (not shown) and a guide 108 which facilitates the insertion and seating of a communication headset.

Mounting panel 102 further includes a printed circuit board 110 (internal) which is in electrical connection with the electrical contacts 106. The printed circuit board can preferably include a processor and memory, and is operable to generally manage communications through the device 100.

Affixed to mounting panel 102 is elongated tongue 112. Elongated tongue 112 is preferably configured for insertion between an inner shell and an outer shell of a protective helmet, as will be described in greater detail below. Additionally, in one arrangement, elongated tongue 112 supports an antenna which is electrically connected to the printed circuit board 110, as will also be described in greater detail below.

In one arrangement, a boom 114 having a free end is mounted to mounting panel 102. A microphone 116 is mounted to the free end of the boom 114. The boom 114 and microphone 116 operate to receive audible signals, such as the voice of the user, and transmit them to the printed circuit board 110, in furtherance of two way communication.

Mounting panel 102 can also include fingers shaped and positioned to snap-lock engage the communication headset to the mounting panel 102. Preferably, the electrical contacts of the communication headset will engage with the electrical contacts 106 of the mounting panel 102, thereby facilitating communication between the headset and the mounting panel 102. The mounting panel 102 also preferably includes a tab configured for manual depressable movement. The tab is configured such that when it is depressed, the communication headset is released from the snap-lock engagement described above.

Device 100 additionally includes one or more wires 118 in conductively electrical contact with the printed circuit board 110. The wires 118 extend to one or more speakers 120. In operation, the wires receive communication signals from the circuit board 110, and these signals are transmitted to the speakers 120, where they are converted to audible sound, in furtherance of two-way communication. The speakers 120 can be mounted within a protective helmet, and positioned in an area proximate to a user's ear(s). Such a configuration enhances the user's ability to participate in two-way communication by projecting audio within the user's protective helmet.

Figure 2:
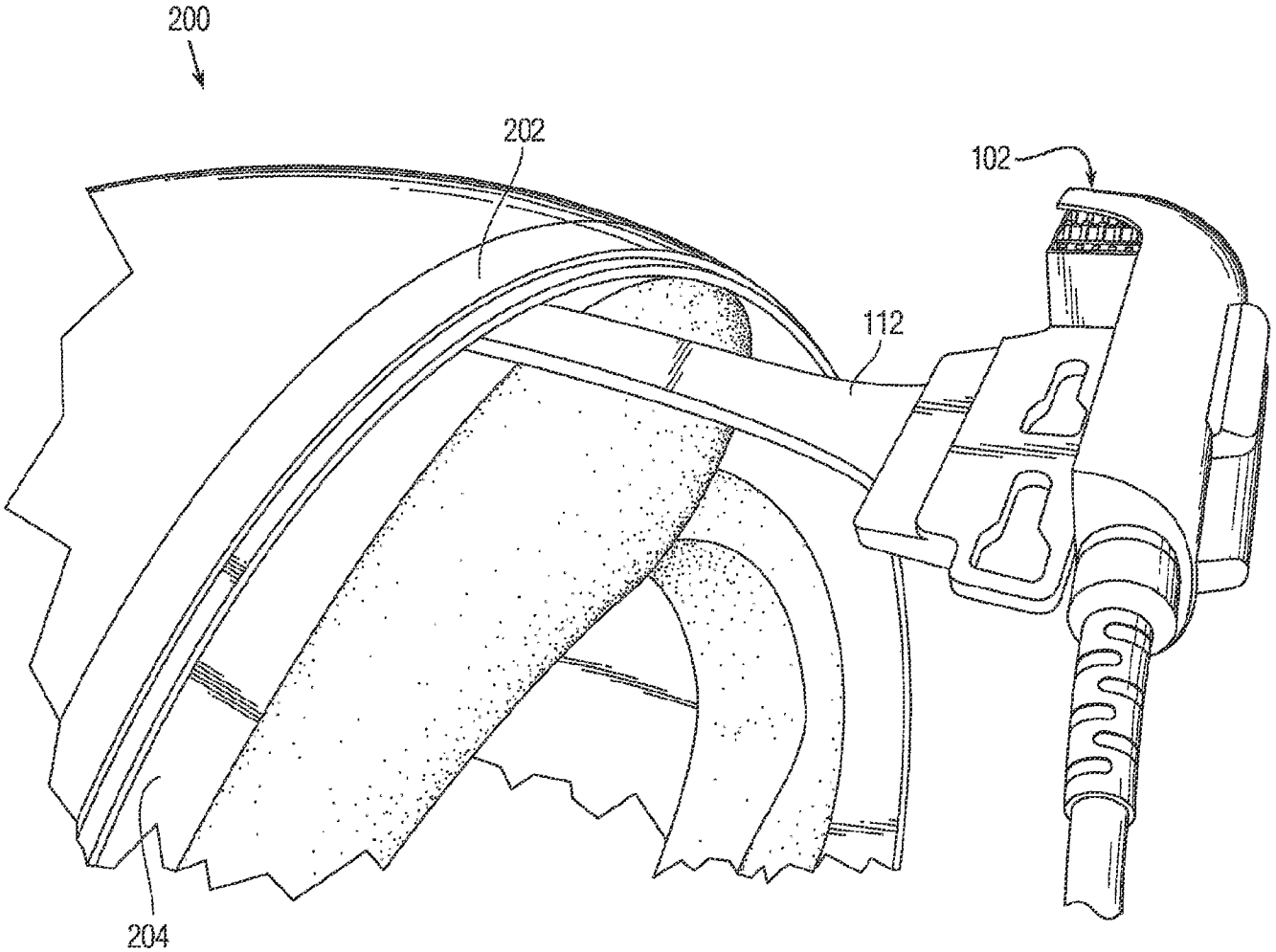
FIG. 2 is an exemplary diagram of the device for mounting a communication headset is being inserted into a protective helmet.
Figure 3:
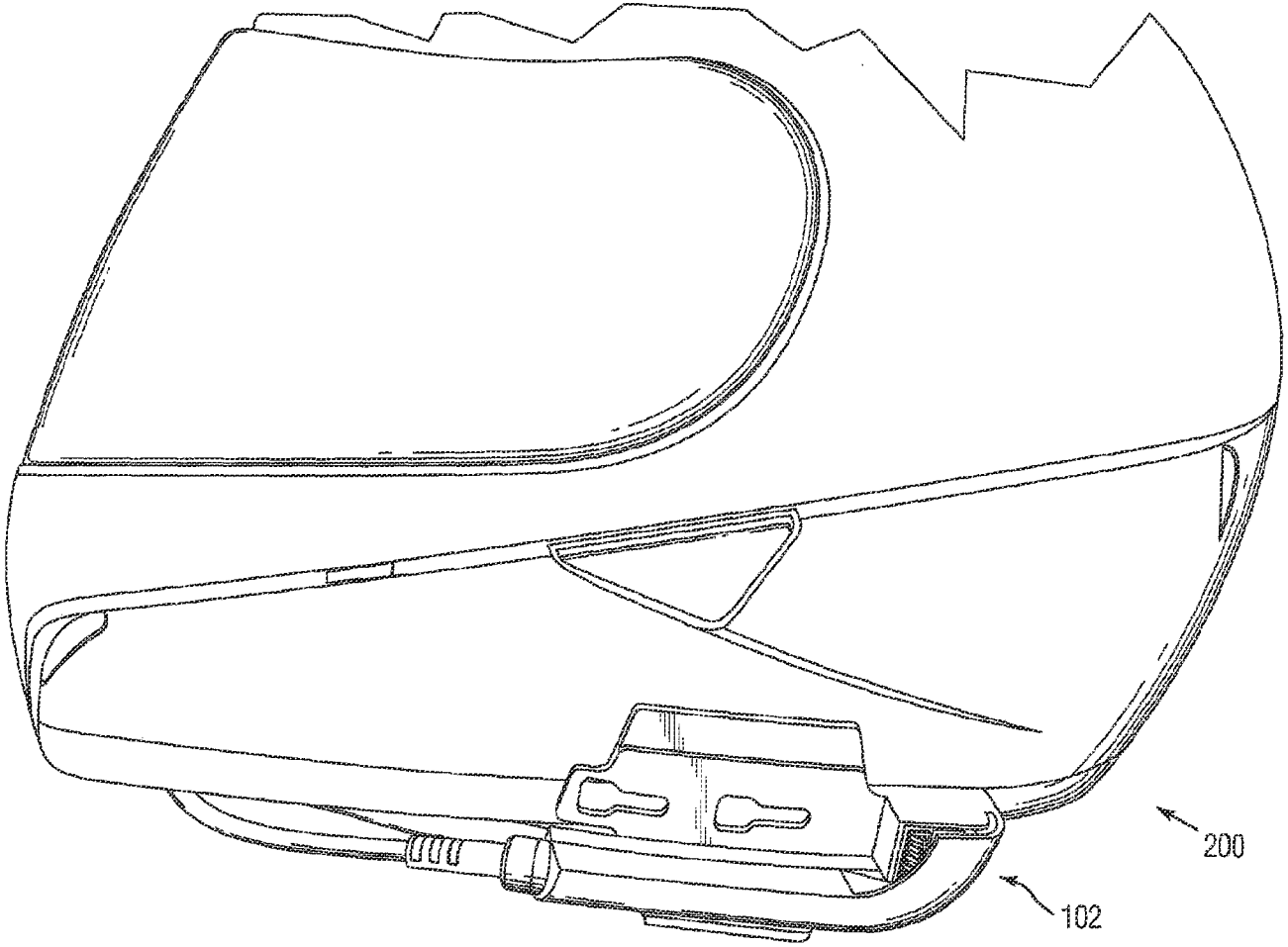
FIG. 3 is an exemplary diagram depicting the device for mounting a communication headset fully inserted and engaged with the helmet.

Turning now to FIG. 2, the device for mounting a communication headset 100 is depicted being inserted into a protective helmet 200. Most protective helmets 200 (such as motorcycle helmets) comprise an outer shell 202 which has an inner shell 204 closely fitted within it. To engage the device 100 with the helmet 200, the elongated tongue 112 is inserted into the area where the outer shell 202 and the inner shell 204 meet, as depicted in FIG. 2. The tongue preferably has a broad surface as shown that prevents rotation between the outer shell and the inner shell. In doing so, the secure fit of the inner shell 204 within the outer shell 202, in combination with the thickness of the elongated tongue 112, provides pressure on the tongue 112 which serves to secure the tongue, and thereby the mounting panel 102, in place. FIG. 3 depicts the device 100 fully inserted and engaged with the helmet 200.

Figure 5A:
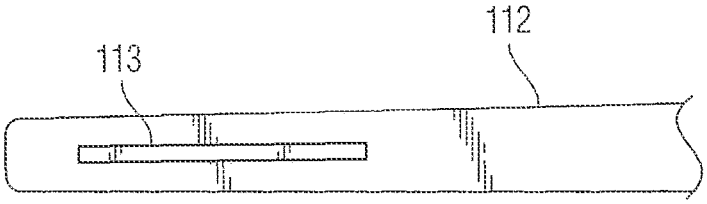
FIG. 5A depicts a flexible tongue in a straight position.
Figure 5B:
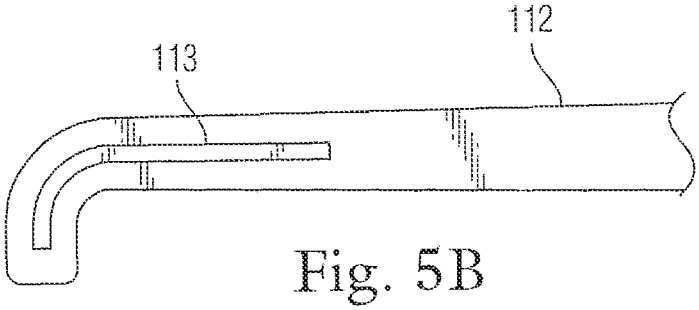
FIG. 5B depicts the flexible tongue in a bent shape.

In order to further stabilize and secure the placement and positioning of the elongated tongue 112 and/or the mounting panel 102, in one arrangement elongated tongue 112 extends away from mounting panel 102 to a free end, the free end constructed so as to take a set out of the plane of a remainder of the tongue 112 in order to secure the tongue 112, and thereby the mounting panel 102, to the helmet 200, as depicted in FIGS. 5A and 5B. That is, the free end or the entire tongue 102 can be constructed from or be coated with or otherwise include a flexible, malleable substance or material 113 which enables the free end to be bent and/or shaped in a variety of ways and directions. Prior to or upon inserting the tongue 112 into the helmet 200 (as described above), the user can adjust the shape of the tongue (such as by bending it to clasp a portion of the interior of the helmet 200 from a straight configuration to a bent configuration) in order to further secure the positioning of the tongue 112 and the mounting panel 102. FIG. 5A depicts the tongue 112 in a straight position, while FIG. 5B depicts the tongue 112 in a bent shape.

Figure 6:
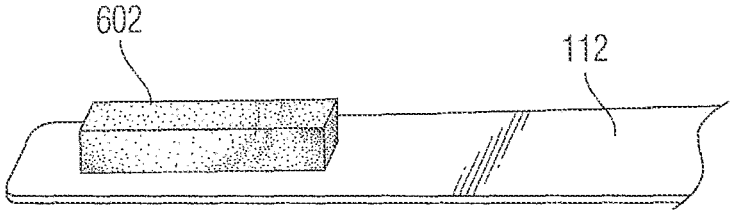
FIG. 6 depicts the elongated tongue having a resilient expansion member affixed thereto.

In another arrangement, the free end of elongated tongue 112 includes a resilient expansion member 602 affixed to at least a portion of the tongue 112, as depicted in FIG. 6. That is, the free end or the entire tongue 112 can be constructed from, be coated with, or support an affixed resilient/expanding substance or material, or can have a resilient expansion member 602 affixed to it, thereby enabling the free end to be compressed and expanded. Prior to or upon inserting the tongue 112 into the helmet 200 (as described above), the user can adjust the shape of the tongue 112 and/or the resilient expansion member 602 (such as by compressing it) and, insert it into the helmet 200 (as described above), whereupon the resilient material expands, thereby further secure the positioning of the tongue 112 and the mounting panel 102. In yet another arrangement, the resilient expansion member can be an inflatable cavity or bladder. When deflated, the tongue 102 can be inserted into the helmet. Upon insertion, the user can inflate the bladder, thereby further securing the positioning of the tongue 112 and the mounting panel 102.

Figure 4:
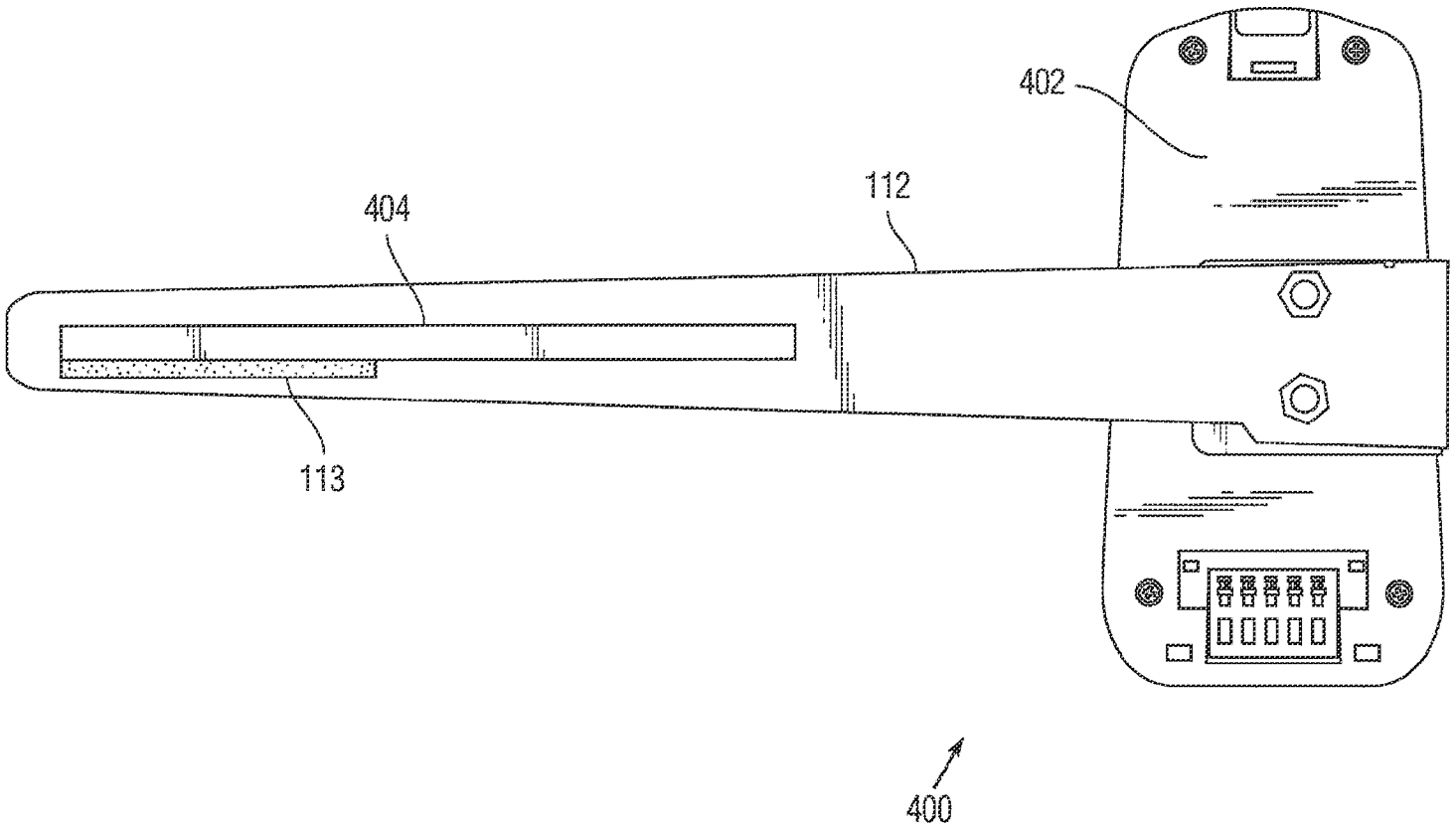
FIG. 4 is an exemplary diagram of a helmet mountable communication headset.

Turning now to FIG. 4, an alternate arrangement of device 100 is presented. In this arrangement, a helmet mountable communication headset 400 is provided. The helmet mountable communication headset 400 includes a wireless communication device 402 which is configured to support two-way communication with a second device. The wireless communication device 402 preferably includes a microphone and speaker, substantially as described above. By way of example, wireless communication device 402 can be a conventional Bluetooth headset.

Affixed to wireless communication device 402 is an elongated tongue 112, as described in detail above. The tongue 112 is configured for insertion between the inner and outer shells of a protective helmet, as also described in detail above.

The elongated tongue 112 can additionally support an antenna 404 which is electrically connected to the wireless communication device 402. Thus, the antenna can be on or within the tongue. In this configuration, the antenna 404 provides additional and enhanced transmission and reception capabilities to the wireless communication device 402. It should be understood that, although not shown, the device for mounting a communication headset 100, described in detail above, can similarly implement such an antenna 404 on its elongated tongue 112, whereby the antenna 404 electrically connected to printed circuit board 110.

Figure 7:
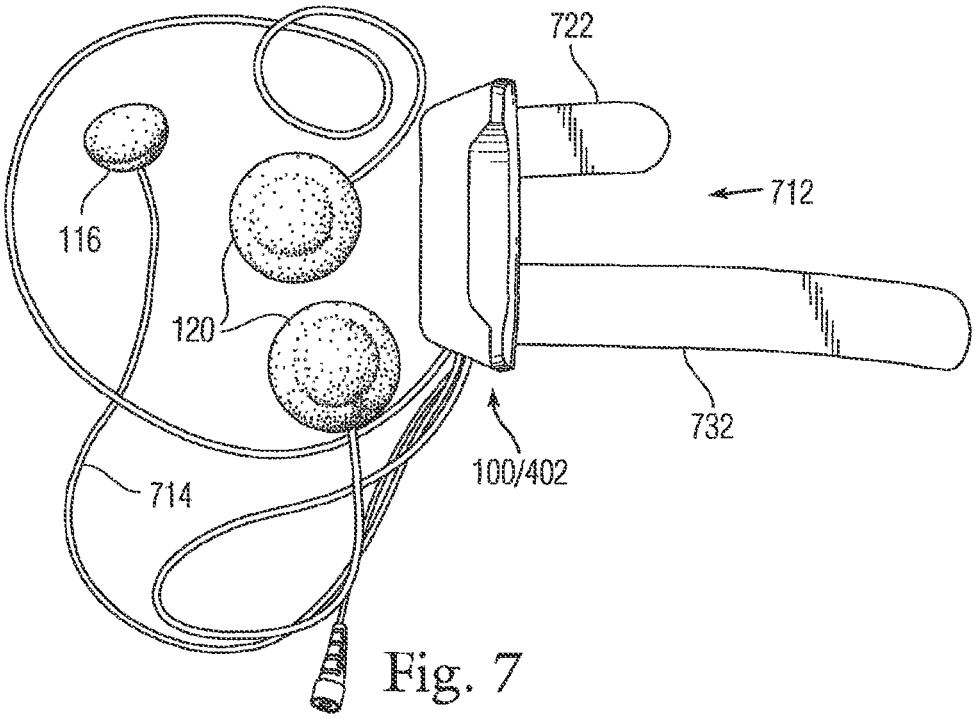
FIG. 7 depicts another elongated tongue arrangement suitable for use with a device for mounting a communication headset as in FIG. 1 or with a helmet mountable communication headset as in FIG. 4.

FIG. 7 illustrates an alternative arrangement for a tongue 712 in which the tongue has plural broad surfaces 722, 732 that extend from the device 100 or from a wireless communication device 402. The tongues are sized and shaped for insertion into a protective helmet 200, substantially as described above, except in relation to this embodiment both tongue surfaces 722, 732 are advanced in tandem into a position between the outer shell 202 and the inner shell 204 of the helmet 200.

Figure 8:
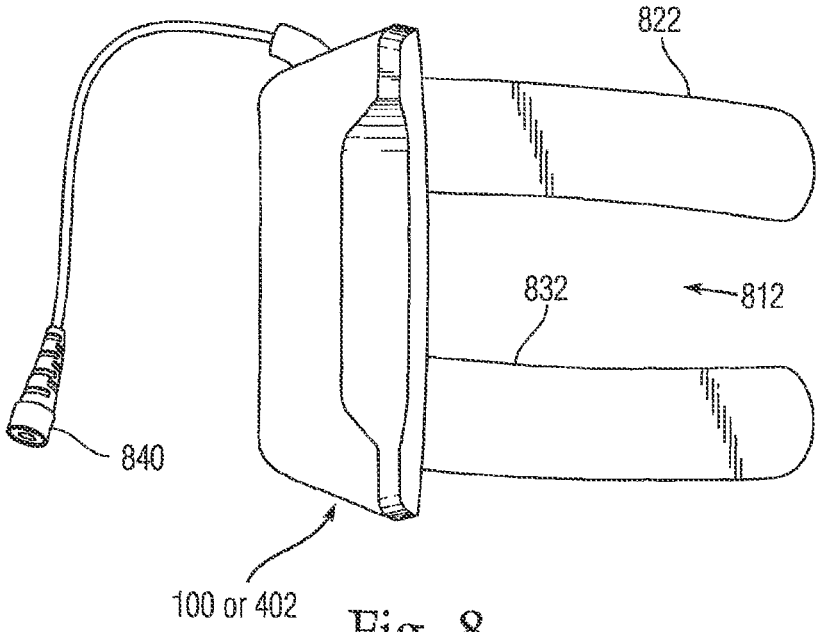
FIG. 8 depicts a further elongated tongue arrangement suitable for use with a device for mounting a communication headset as in FIG. 1 or with a helmet mountable communication headset as in FIG. 4.

In FIG. 7, the broad surfaces 722, 723 have different lengths, but that is merely one possibility. As shown in FIG. 8, the tongue 812 again has plural broad surfaces (two being shown) 822, 832 that extend substantially in parallel for the same length. Also, a tongue with plural broad surfaces can first extend away from the device 100 or from a wireless communication device 402 as a single broad surface that forks into the plural broad surfaces shown in the figures.

The tongues 712, 812 can be provided with any of the features described above in connection with FIGS. 4-6, namely, one or more antennae 404 for Bluetooth communication, FM radio reception, and other frequency bands, a material 113 that can take a set, and/or an expansion member 602. When fully inserted into the helmet, the arrangement of FIGS. 7 and 8 have the same external appearance as shown in FIG. 3.

Also shown in FIG. 7, instead of a boom 114, a microphone 116 can be disposed at the end of a flexible wire 714 for direct attachment within the helmet at an arbitrary location, such as by hook and loop fasteners. Also shown in FIG. 8, instead of wires connecting speakers 120 and microphone 116, a jack 840 can be provided through which electrical contact can be made to speakers and a microphone.

Figure 9:
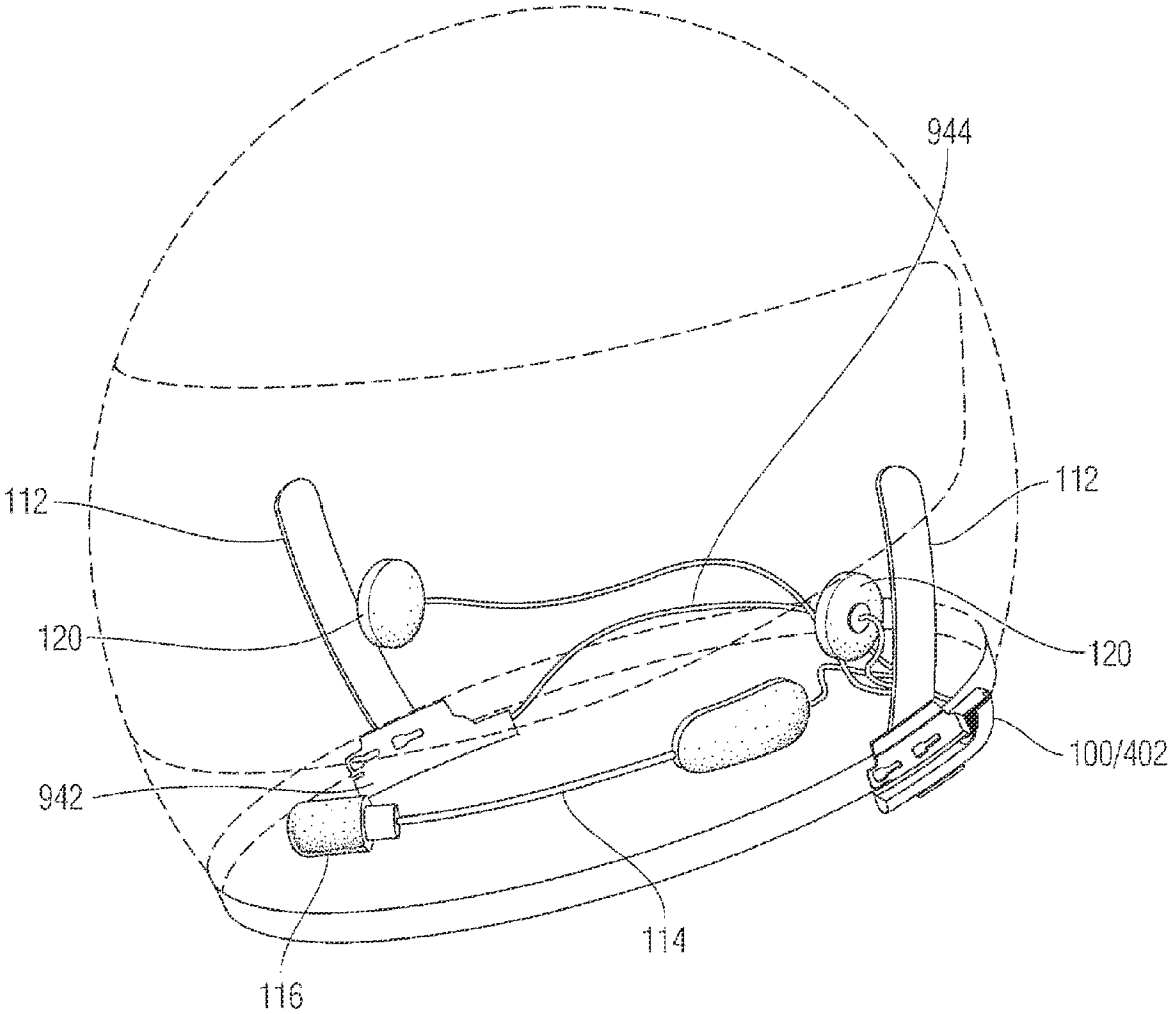
FIG. 9 depicts an arrangement in which a battery pack is mounted to a helmet separate from the devices 100 and 402 illustrated in FIGS. 1 and 4, respectively.

In a further variation, as shown in FIG. 9, a battery unit 942 can be mounted to a helmet 200 in the same manner as the device 100 or from a wireless communication device 402 by providing that unit with a tongue 112, 712, 812 as described hereinabove. A wire 944 carries power to the main unit 100/402.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A device for mounting a communication headset to a helmet, the device comprising:

a mounting panel having a seat in a front surface thereof that includes a set of electrical contacts and a guide;

a printed circuit board in electrical connection with the electrical contacts; and an elongated tongue affixed to the mounting panel;

wherein the tongue is configured for insertion between an inner shell and an outer shell of a protective helmet, the elongated tongue having a straight configuration prior to insertion between the inner shell and the outer shell, wherein the mounting panel is configured for placement along an outer surface of the helmet;

*wherein the mounting panel includes fingers shaped and positioned to snap-lock engage the communication headset to the mounting panel;*

*wherein the mounting panel further comprises a tab configured for manual depressable movement so as to release the communication headset from the snap-lock engagement.*

[2. The device of claim 1, wherein an antenna is supported along a length of the elongated tongue, the antenna being electrically connected to the printed circuit board.]

[3. The device of claim 1, further comprising:

a boom mounted to the mounting panel, the boom having a free end; and a microphone mounted to the free end of the boom.]

[4. The device of claim 1, wherein the mounting panel includes fingers shaped and positioned to snap-lock engage the communication headset to the mounting panel.]

[5. The device of claim 4, wherein the mounting panel further comprises a tab configured for manual depressable movement so as to release the communication headset from the snap-lock engagement.]

[6. The device of claim 1, further comprising a wire in conductively electrical contact with the printed circuit board and extending to one or more speakers.]

[7. The device of claim 1, further comprising one or more speakers in conductive contact with the printed circuit board.]

[8. The device of claim 1, further comprising one or more speakers in conductive contact with the printed circuit board.]

[9. The device of claim 1, wherein the tongue extends away from the mounting panel to a free end, wherein at least a portion of the free end is formed of a flexible material to allow at least portion of the free end to bend and lie outside of a plane in which a remainder of the elongated tongue lies in order to secure the device to the helmet.]

10. [The device of claim 1,] *A device for mounting a communication headset to a helmet, the device comprising:*

*a mounting panel having a seat in a front surface thereof that includes a set of electrical contacts and a guide;*

*a printed circuit board in electrical connection with the electrical contacts; and*

*an elongated tongue affixed to the mounting panel;*

*wherein the tongue is configured for insertion between an inner shell and an outer shell of a protective helmet, the elongated tongue having a straight configuration prior to insertion between the inner shell and the outer shell, wherein the mounting panel is configured for placement along an outer surface of the helmet;* wherein the tongue extends away from the mounting panel to a free end, the device further comprising a resilient expansion member affixed to at least a portion of the tongue proximate the free end, wherein the expansion member resiliently expands against any compressive force imparted by the helmet in order to secure the device to the helmet.

11. [The device of claim 1,] *A device for mounting a communication headset to a helmet, the device comprising:*

*a mounting panel having a seat in a front surface thereof that includes a set of electrical contacts and a guide;*

*a printed circuit board in electrical connection with the electrical contacts; and*

*an elongated tongue affixed to the mounting panel;*

*wherein the tongue is configured for insertion between an inner shell and an outer shell of a protective helmet, the elongated tongue having a straight configuration prior to insertion between the inner shell and the outer shell, wherein the mounting panel is configured for placement along an outer surface of the helmet;* wherein the tongue comprises first and second elongated tongues, each tongue being configured for insertion between the inner shell and the outer shell of the protective helmet.

12. The device of claim 11, wherein the first and second tongues are spaced apart from one another and extend in parallel away from the mounting panel to respective free ends.

13. The device of claim 11, wherein the first and second tongues extend different lengths away from the mounting panel to respective free ends.

14. The device of claim 11, wherein the first and second tongues are part of a forked structure.

[15. A helmet-mountable communication headset comprising:

a wireless communication device configured to support two way communication with a second device, the wireless communication device having a microphone and a speaker and a mounting panel having a seat in a front surface and a guide, and an elongated tongue affixed to the mounting panel of the wireless communication device;

wherein the tongue is configured for insertion between an inner shell and an outer shell of a protective helmet, the elongated tongue having a straiqht configuration prior to insertion between the inner and outer shells, wherein an upper section of the tongue extends upwardly from an upper edge of the mounting panel, the upper section being completely remote from and free of contact with the mounting panel, the mounting panel being configured for placement along an outer surface of the helmet.]

[16. The device of claim 15, wherein an antenna is fixedly disposed along a length of the elongated tongue, the elongated tongue being electrically connected to the wireless communication device.]

17. [The device of claim 15.] *A helmet-mountable communication headset comprising:*

*a wireless communication device configured to support two way communication with a second device, the wireless communication device having a microphone and a speaker and a mounting panel having a seat in a front surface and a guide, and*

*an elongated tongue affixed to the mounting panel of the wireless communication device;*

*wherein the tongue is configured for insertion between an inner shell and an outer shell of a protective helmet, the elongated tongue having a straight configuration prior to insertion between the inner and outer shells, wherein an upper section of the tongue extends upwardly from an upper edge of the mounting panel, the upper section being completely remote from and free of contact with the mounting panel, the mounting panel being configured for placement along an outer surface of the helmet;* wherein the tongue comprises separate first and second elongated tongues, each tongue being configured for insertion between the inner shell and the outer shell of the protective helmet.

18. The device of claim 17, wherein the first and second tongues are spaced apart from one another and extend in parallel away from the mounting panel to respective free ends.

19. The device of claim 17, wherein the first and second tongues extend different lengths away from the mounting panel to respective free ends.

20. The device of claim 17, wherein the first and second tongues are part of a forked structure.

21. [The device of claim 15.] *A helmet-mountable communication headset comprising:*

*a wireless communication device configured to support two way communication with a second device, the wireless communication device having a microphone and a speaker and a mounting panel having a seat in a front surface and a guide, and*

*an elongated tongue affixed to the mounting panel of the wireless communication device;*

*wherein the tongue is configured for insertion between an inner shell and an outer shell of a protective helmet, the elongated tongue having a straight configuration prior to insertion between the inner and outer shells, wherein an upper section of the tongue extends upwardly from an upper edge of the mounting panel, the upper section being completely remote from and free of contact with the mounting panel, the mounting panel being configured for placement along an outer surface of the helmet;* wherein the mounting panel has opposing ends and the upper edge that extends between the ends, a length being defined between the ends and a height being defined between the upper edge and a lower edge, the length being greater than the height.

[22. A device for mounting a communication headset to a helmet, the device comprising:

a mounting panel having a seat in a front surface thereof that includes a set of electrical contacts and a guide;

a printed circuit board in electrical connection with the electrical contacts; and an elongated tongue affixed to the mounting panel;

wherein the elongated tongue is configured for insertion between an inner shell and an outer shell of a protective helmet;

an antenna supported on the elongated tongue and in electrical connection with the printed circuit board.]

[23. The device of claim 22, wherein the antenna is on or within the elongated tongue and is disposed between a free end of the elongated tongue and a second end of the tongue that is proximate to the mounting panel.]

*24. A device for mounting a communication headset to a helmet, the device comprising:*

*a mounting panel having a seat in a front surface thereof that includes a set of electrical contacts and a guide;*

*a printed circuit board in electrical connection with the electrical contacts; and*

*an elongated tongue affixed to the mounting panel;*

*wherein the tongue is configured for insertion between an inner shell and an outer shell of a protective helmet, the elongated tongue having a straight configuration prior to insertion between the inner shell and the outer shell, wherein the mounting panel is configured for placement along an outer surface of the helmet;*

*wherein the mounting panel further comprises a tab configured for depressable movement so as to lock the communication headset to the device.*

*25. A device for mounting a communication headset to a helmet, the device comprising:*

*a mounting panel having a seat in a front surface thereof that includes a set of electrical contacts and a guide;*

*a printed circuit board in electrical connection with the electrical contacts; and*

*an elongated tongue affixed to the mounting panel;*

*wherein the tongue is configured for insertion between an inner shell and an outer shell of a protective helmet, the elongated tongue having a straight configuration prior to insertion between the inner shell and the outer shell, wherein the mounting panel is configured for placement along an outer surface of the helmet;*

*wherein the guide comprises at least two cutouts along which the communication headset may slide;*

*wherein the at least two cutouts are parallel to each other;*

*wherein the guide comprises a guide surface that defines a guide plane, and the two cutouts are parallel to the guide plane.*

*26. The device of claim 25, wherein the communication headset may slide in a direction parallel to the guide plane.*

*27. The device of claim 25, wherein the guide surface is vertical when the device is installed on the helmet.*

*28. A device for mounting a communication headset to a helmet, the device comprising:*

*a mounting panel having a seat in a front surface thereof that includes a set of electrical contacts and a guide;*

*a printed circuit board in electrical connection with the electrical contacts; and*

*an elongated tongue affixed to the mounting panel;*

*wherein the tongue is configured for insertion between an inner shell and an outer shell of a protective helmet, the elongated tongue having a straight configuration prior to insertion between the inner shell and the outer shell, wherein the mounting panel is configured for placement along an outer surface of the helmet;*

*wherein the guide comprises at least two cutouts along which the communication headset may slide;*

*wherein the mounting panel further comprises a tab configured for depressable movement so as to lock the communication headset to the device.*

*29. A device for mounting a communication headset to a helmet, the device comprising:*

*a mounting panel having a seat in a front surface thereof that includes a set of electrical contacts and a guide;*

*a printed circuit board in electrical connection with the electrical contacts; and*

*an elongated tongue affixed to the mounting panel;*

*wherein the tongue is configured for insertion between an inner shell and an outer shell of a protective helmet, the elongated tongue having a straight configuration prior to insertion between the inner shell and the outer shell, wherein the mounting panel is configured for placement along an outer surface of the helmet;*

*wherein the guide comprises a guide surface that defines a guide plane, the guide surface comprises at two cutouts that are parallel to the guide plane, wherein the electrical contacts are positioned farther from the outer surface of the helmet than the guide surface when the device is installed on the helmet.*

*30. A device for mounting a communication headset to a helmet, the device comprising:*

*a mounting panel having a seat in a front surface thereof that includes a set of electrical contacts and a guide;*

*a printed circuit board in electrical connection with the electrical contacts; and*

*an elongated tongue affixed to the mounting panel;*

*wherein the tongue is configured for insertion between an inner shell and an outer shell of a protective helmet, the elongated tongue having a straight configuration prior to insertion between the inner shell and the outer shell, wherein the mounting panel is configured for placement along an outer surface of the helmet;*

*wherein the guide comprises a guide surface that defines a guide plane, and the communication headset may slide in a direction parallel to the guide plane.*

* * * * *